(12) United States Patent
Breuer et al.

(10) Patent No.: US 11,148,706 B2
(45) Date of Patent: Oct. 19, 2021

(54) STEERING SHAFT FOR A MOTOR VEHICLE

(71) Applicants: THYSSENKRUPP PRESTA AG, Eschen (LI); thyssenkrupp AG, Essen (DE)

(72) Inventors: Marius Breuer, Fishers, IN (US); Janick Durot, Widnau (CH); Bernhard Jaeger, Wangen (DE); Daniel Frei, Mauren (LI); Jan Meyer, Hard (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 368 days.

(21) Appl. No.: 16/324,377

(22) PCT Filed: Aug. 10, 2017

(86) PCT No.: PCT/EP2017/070272
§ 371 (c)(1),
(2) Date: Feb. 8, 2019

(87) PCT Pub. No.: WO2018/029289
PCT Pub. Date: Feb. 15, 2018

(65) Prior Publication Data
US 2019/0176871 A1 Jun. 13, 2019

(30) Foreign Application Priority Data
Aug. 11, 2016 (DE) .................... 10 2016 114 970.5

(51) Int. Cl.
*B62D 1/20* (2006.01)
*F16D 3/06* (2006.01)
(Continued)

(52) U.S. Cl.
CPC ................. *B62D 1/20* (2013.01); *B62D 1/16* (2013.01); *F16C 3/03* (2013.01); *F16D 3/06* (2013.01);
(Continued)

(58) Field of Classification Search
CPC .... B62D 1/20; B62D 1/16; F16D 3/06; F16D 2300/12; F16D 3/40; F16C 3/03;
(Continued)

(56) References Cited

U.S. PATENT DOCUMENTS 2,380,287 A * 7/1945 Baumbach .............. F16B 19/02
29/DIG. 23
3,399,549 A * 9/1968 Francis .................... F16D 3/06
464/162
(Continued)

FOREIGN PATENT DOCUMENTS

CN     203996397 U    12/2014
EP     1 674 749 A    6/2006
(Continued)

OTHER PUBLICATIONS

English Translation of International Search Report issued in PCT/EP2017/070272, dated Nov. 9, 2017.

*Primary Examiner* — Greg Binda
(74) *Attorney, Agent, or Firm* — thyssenkrupp North America, LLC

(57) ABSTRACT

A steering shaft for a motor vehicle has an inner shaft, arranged in an outer shaft that is displaceable axially in the direction of an axis of rotation. The inner shaft includes axially running radial projections on its outer side. The outer shaft includes axially running grooves on its inner side, into which grooves the projections of the inner shaft engage in a positively locking manner in a direction of rotation and displaceably in an axial direction. With regard to fault-free (Continued)

operation during fluctuating temperatures, on the inner shaft, there is arranged a profiled sleeve with undulating cross-sectional profile, the inner surface of which lies against the flanks of the projections of the inner shaft and the outer surfaces of which lie against the flanks of the grooves of the outer shaft, wherein the profiled sleeve is connected to the inner shaft at one or more fastening points.

15 Claims, 8 Drawing Sheets

(51) Int. Cl.
*F16C 3/03* (2006.01)
*B62D 1/16* (2006.01)
*F16C 29/02* (2006.01)
*F16C 29/12* (2006.01)
*F16D 3/40* (2006.01)

(52) U.S. Cl.
CPC .............. *F16C 29/02* (2013.01); *F16C 29/12* (2013.01); *F16C 2226/36* (2013.01); *F16C 2326/24* (2013.01); *F16D 3/40* (2013.01); *F16D 2300/12* (2013.01); *Y10S 29/023* (2013.01); *Y10T 403/7035* (2015.01)

(58) Field of Classification Search
CPC ...... F16C 29/02; F16C 29/12; F16C 2226/36; F16C 2326/24; Y10S 29/023; Y10T 403/7035
USPC ...................................... 464/16, 162; 384/42
See application file for complete search history.

(56) References Cited

U.S. PATENT DOCUMENTS

| | | | | |
|---|---|---|---|---|
| 4,180,990 | A * | 1/1980 | Hill | F16D 3/50 |
| 7,344,620 | B2 * | 3/2008 | Jung | B06B 3/00 |
| 7,559,266 | B2 * | 7/2009 | Kurokawa | B62D 1/185 |
| | | | | 74/492 |
| 8,388,455 | B2 * | 3/2013 | Eltner | F16C 3/03 |
| | | | | 464/16 |
| 2014/0020502 | A1 | 1/2014 | Schnitzer | |
| 2014/0041194 | A1 | 2/2014 | Kurokawa | |
| 2015/0251399 | A1 | 9/2015 | Nishida | |

FOREIGN PATENT DOCUMENTS

| | | |
|---|---|---|
| JP | 2013-142437 A | 7/2013 |
| JP | 5 549 658 B | 7/2014 |
| WO | 2012/066904 A | 5/2012 |
| WO | 2016/058723 A | 4/2016 |

* cited by examiner

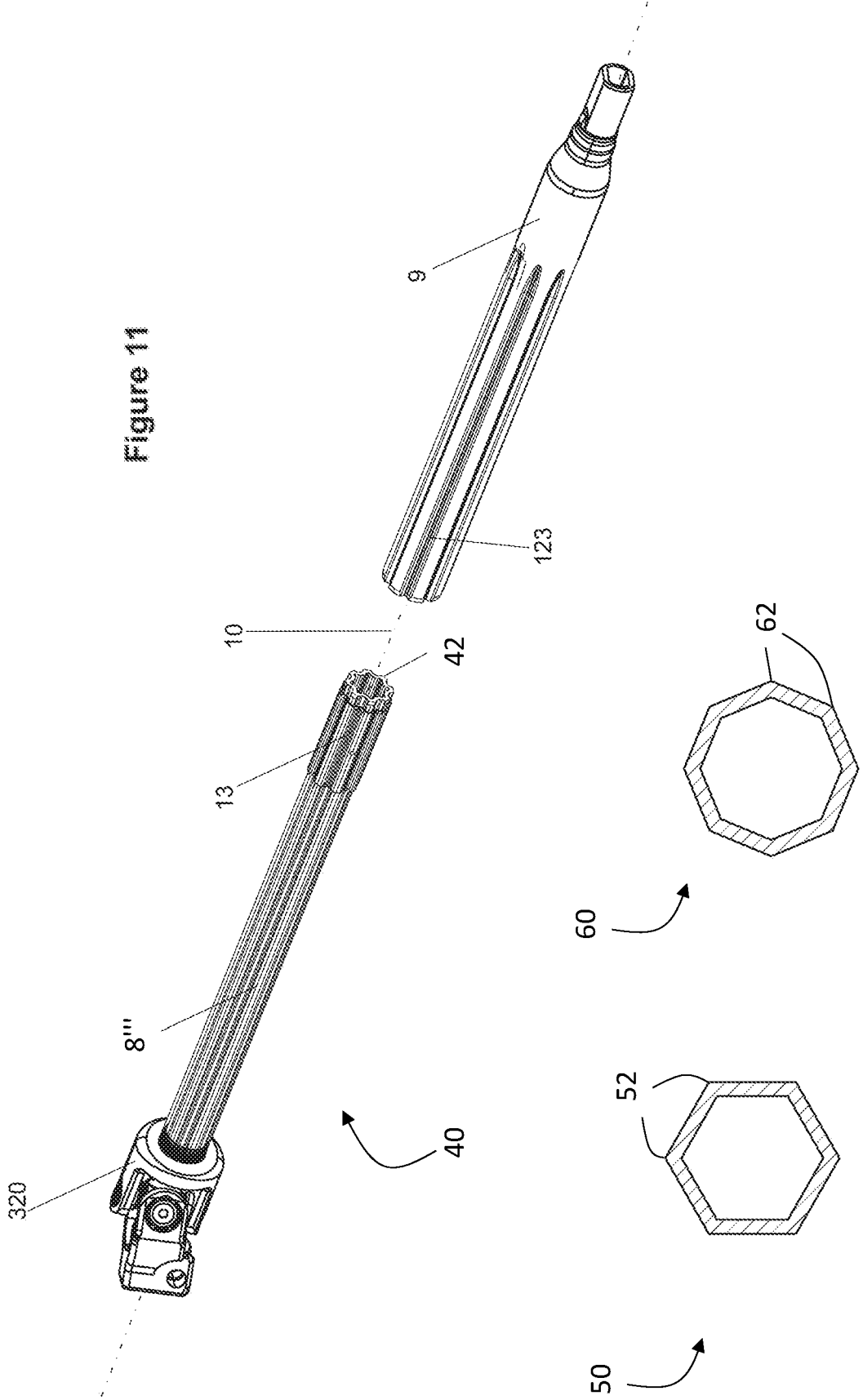

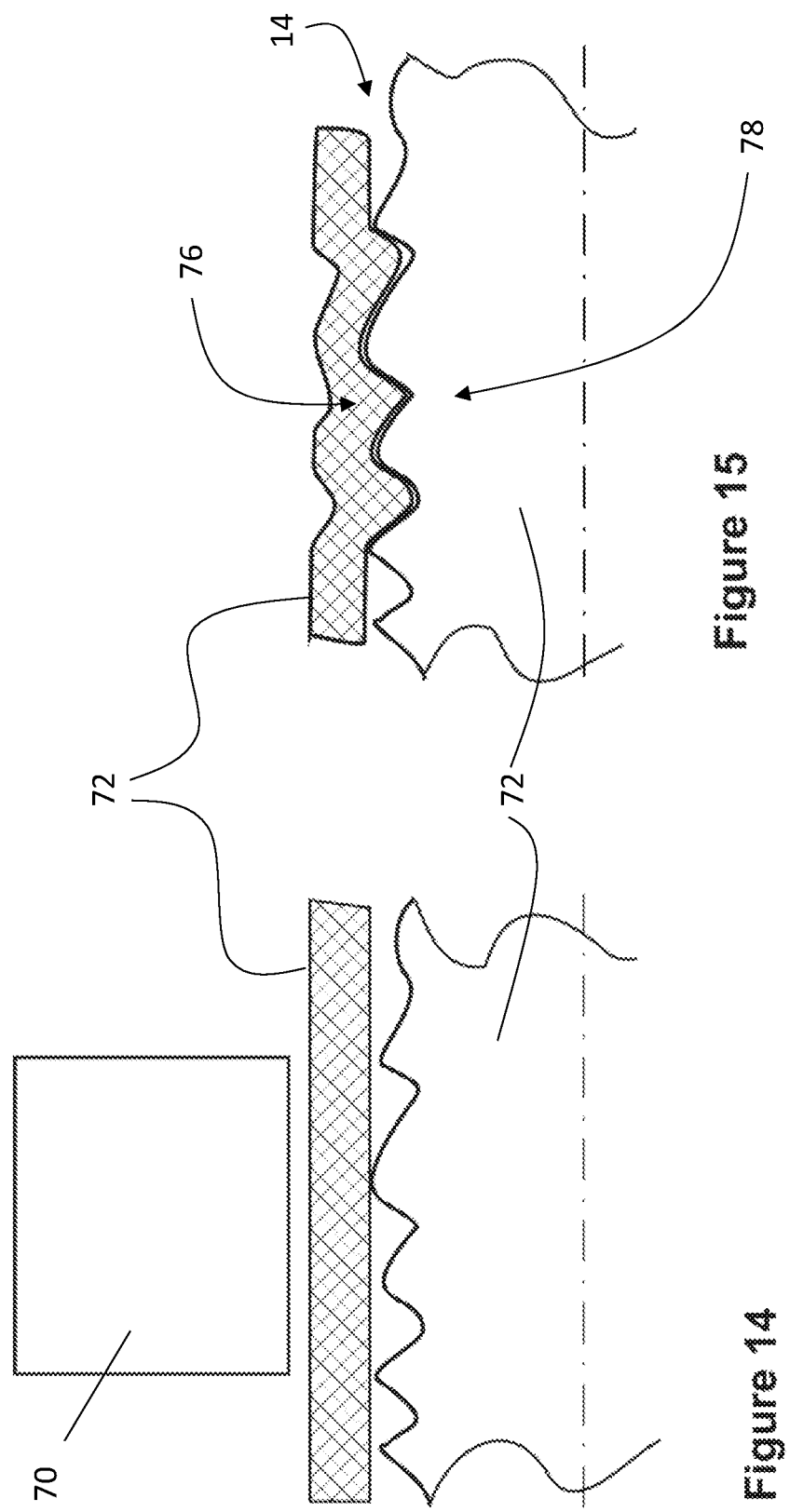

STEERING SHAFT FOR A MOTOR VEHICLE

CROSS REFERENCE TO RELATED APPLICATIONS

This application is a U.S. National Stage Entry of International Patent Application Serial Number PCT/EP2017/070272, filed Aug. 10, 2017, which claims priority to German Patent Application No. DE 10 2016 114 970.5, filed Aug. 11, 2016, the entire contents of both of which are incorporated herein by reference.

FIELD

The present disclosure generally relates to a steering shaft for a motor vehicle.

BACKGROUND

A two-part telescopic steering shaft is known for example from JP 2013-142437 A. A coating is applied to an inner shaft, which coating surrounds the radial projections and the outer side of which coating is in contact with the grooves of the outer shaft. The coating serves for reducing sliding friction. To improve the connection between the coating and the inner shaft, the inner shaft comprises superficial unevennesses which arise during the production process or which are generated retroactively by shot blasting or etching of the surface. During vehicle operation, temperature fluctuations arise at the steering shaft, which have the result that the coating between the inner shaft and the outer shaft expands, and in the process the two shafts become jammed, or the coating contracts, such that increased play arises between the two shafts. Both are undesirable.

Thus, a need exists for a steering shaft for a motor vehicle in the case of which temperature fluctuations have no adverse effects on the interaction of the two shafts.

SUMMARY

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering shaft for a motor vehicle, having an inner shaft, which is arranged in an outer shaft so as to be displaceable axially in the direction of an axis of rotation, wherein the inner shaft comprises axially running radial projections on its outer side, and the outer shaft comprises axially running grooves on its inner side, into which grooves the projections of the inner shaft engage in a positively locking manner in a direction of rotation and displaceably in an axial direction.

In some examples, on the inner shaft, there is arranged a profiled sleeve, preferably having an undulating cross-sectional profile or having a profile deviating from a circular shape, the inner circumferential surface of which lies against the flanks of the projections of the inner shaft and the outer circumferential surface of which lies against the flanks of the grooves of the outer shaft, and in that the profiled sleeve is connected to the inner shaft by means of one or more fastening points distributed on a circle over the circumference of the profiled sleeve. A solution has the advantage that the profiled sleeve is on the one hand fastened axially non-displaceably on the inner shaft, but on the other hand can expand and contract in an axial direction in the presence of temperature fluctuations, without the inner shaft becoming jammed in the outer shaft or a no longer tolerable degree of play arising. The radial projections or elevations of the inner shaft may be distributed at regular intervals on the outer circumferential surface. In this way, elevated portions with a relatively large radius in relation to an axis of rotation and, as it were, recessed portions with a relatively smaller radius in relation to the axis of rotation are formed. The elevated and recessed portions alternate, such that a toothing is formed. This toothing may preferably be formed as an arcuate toothing which is equidistant or is equipped with a circumferential contour, for example as a triangle, tetragon, hexagon or octagon. By means of the connection of the profiled sleeve to the inner shaft at the fastening points, a complementary connection between inner shaft and profiled sleeve can be provided.

Multiple fastening points give rise to a secure fastening of the profiled sleeve. The fastening points between the profiled sleeve and the inner shaft are preferably provided in the region of a wall of the radial projections. The fastening points may, in an axial direction of the profiled sleeve, be fastened by means of two or more fastening points to the inner shaft. The profiled sleeve preferably comprises three or four or five or six fastening points in an axial direction. The fastening points may be provided along the entire length of the fastening sleeve in the axial direction. The fastening points between profiled sleeve and inner shaft are particularly preferably arranged at regular intervals in a radial direction. It is preferable for between two and six fastening points to be provided in a radial direction.

It is conceivable and possible for the profiled sleeve and the outer shaft to be connected to one another by means of fastening points.

Since the fastening points are arranged so as to be distributed in a very narrow radial region on a circle over the circumference of the profiled sleeve, the temperature-induced expansion or shrinkage of the profiled sleeve is not impeded. Therefore, bulging or distortion between the profiled sleeve and the inner and outer shaft can be reduced.

The fastening points are preferably formed by means of an ultrasonic sonotrode. This fastening measure leads to a particular intimate connection of the material of the profiled sleeve with that of the inner shaft. Furthermore, the use of an ultrasonic sonotrode is particularly highly suitable for the fixed connection between the materials plastic, on the one hand, and metal, on the other hand.

The invention is further improved through the measure whereby the projections of the inner shaft are equipped with a knurling on their radial outer side. The knurling may preferably be formed as a criss-crossed knurling and/or as a straight and/or transverse and/or oblique knurling in order to improve the connection between profiled sleeve and inner shaft such that malfunctions can be counteracted within the service life of the steering shaft. The wall of the inner shaft is preferably equipped with a knurling.

It is furthermore conceivable and possible for the projections of the inner shaft to be equipped with a depression on their radial outer side or for the wall of the inner shaft to be equipped with a depression. In this way, the profiled sleeve can be pressed into the depressions of the inner shaft.

In a preferred embodiment of the invention, the profiled sleeve is composed of plastic. This material ensures firstly a free sliding movement in the outer shaft and secondly a reduction of the play during the transmission of the steering moment.

BRIEF DESCRIPTION OF THE FIGURES

FIG. 11 is an exploded perspective view of a steering shaft having an inner shaft with axially running radial projections that extend along an entire length of the inner shaft.

FIG. 12 is a cross-sectional view of an example inner shaft with axially running radial projections that define a hexagonal profile.

FIG. 13 is a cross-sectional view of an example inner shaft with axially running radial projections that define an octagonal profile.

FIG. 14 is a schematic cross-sectional view of a sonotrode about to form a fastening point between a profiled sleeve and an outer surface of an inner shaft.

FIG. 15 is a schematic cross-sectional view showing an example ultrasonic fastening point formed between the profiled sleeve and the outer surface of the inner shaft in FIG. 14.

DETAILED DESCRIPTION

Figure 1:
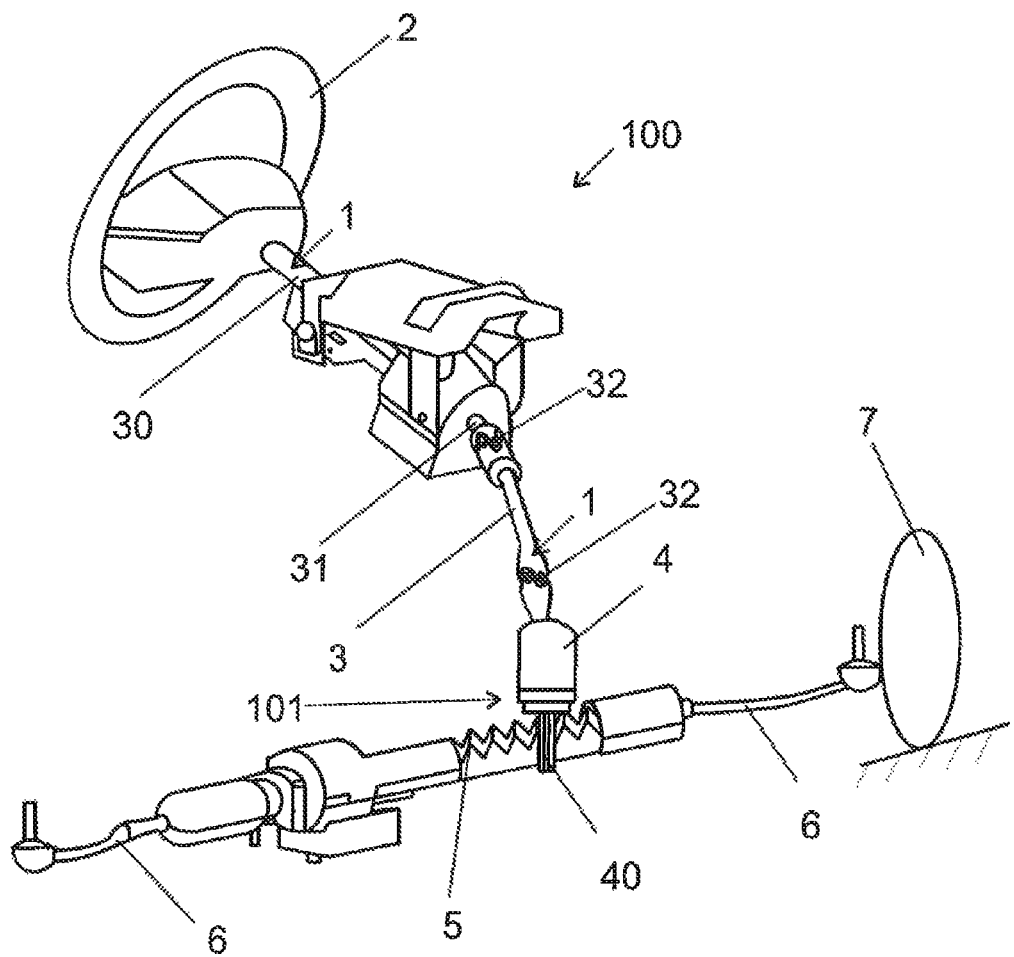
FIG. 1 is a schematic perspective view of a steering system for a motor vehicle.

FIG. 1 illustrates a motor vehicle steering system 100, wherein a driver inputs a steering moment as a steering command into a steering shaft 1 using a steering wheel 2. The steering moment is transmitted via the steering shaft 1 to a steering pinion 40, which meshes with a toothed rack 5. The toothed rack 5 transmits a displacement of the track rods 6 to the steerable vehicle wheels 7. The steering shaft 1 comprises, at the input side, an input shaft 30 connected to the steering wheel 2 and comprises, at the output side, an output shaft 31 connected to the toothed rack 5 via the steering pinion 40. The input shaft 30 and the output shaft 31 are connected to one another in rotationally elastic fashion by means of a torsion bar which is not illustrated in FIG. 1. A steering moment input into the input shaft 30 by the driver using the steering wheel 2 leads to a relative rotation of the input shaft 30 with respect to the output shaft 31. This relative rotation between input shaft 30 and output shaft 31 can be determined by means of a rotational angle sensor.

The steering shaft 1 as per FIG. 1 furthermore comprises one or more cardanic joints 32, by means of which the profile of the steering shaft 1 in the motor vehicle can be adapted to the spatial conditions. The steering intermediate shaft of the steering shaft 1, which in the example illustrated is arranged between two cardanic joints 32, and which connects the output shaft 31 to the steering pinion 40 of the steering gear 101, is designed according to the invention as a variable-length steering shaft 2.

Figure 2:
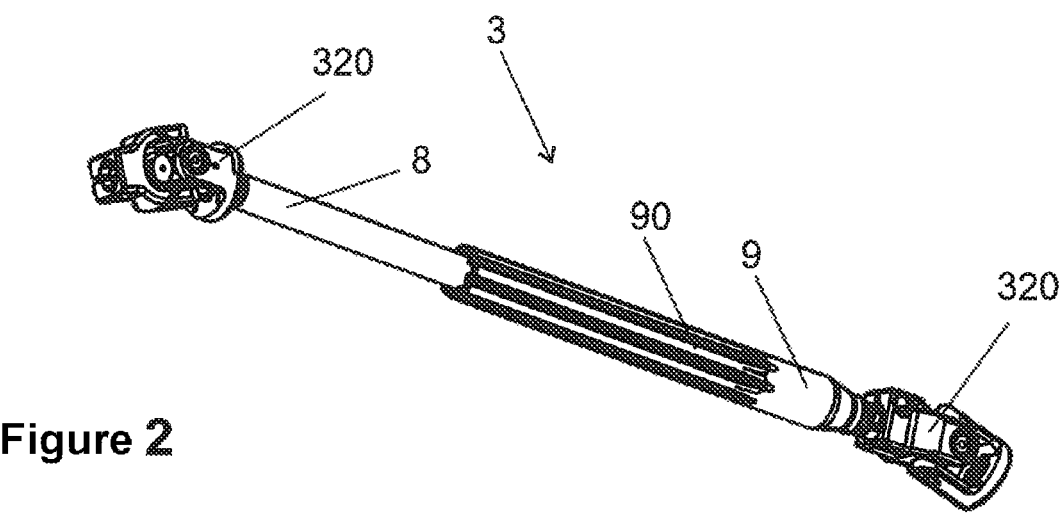
FIG. 2 is a perspective view of a two-part telescopic steering shaft.

FIG. 2 shows a perspective view of the steering shaft 2 in an assembled state.

The steering shaft 3 comprises an inner shaft 8, which is arranged in telescopically displaceable fashion in an outer shaft 9. At their joint-side end, the inner shaft 8 and the outer shaft 9 each comprise a joint fork 320. In this way, a longitudinal adjustment of the steering wheel 2 is permitted even during installation and during driving operation.

Figure 3:
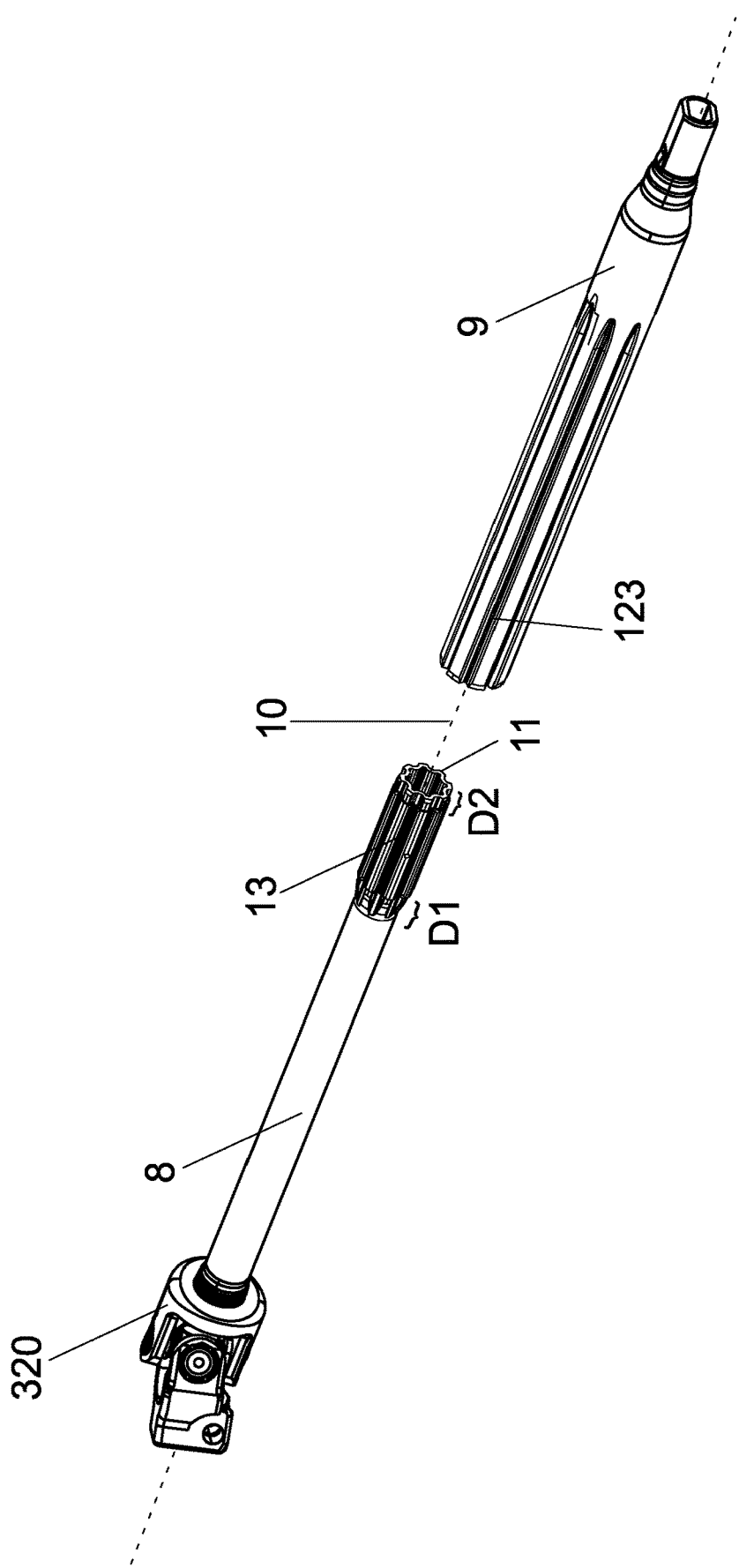
FIG. 3 is a perspective view of a steering shaft, composed of an outer shaft and of an inner shaft equipped with a profiled sleeve.
Figure 4:
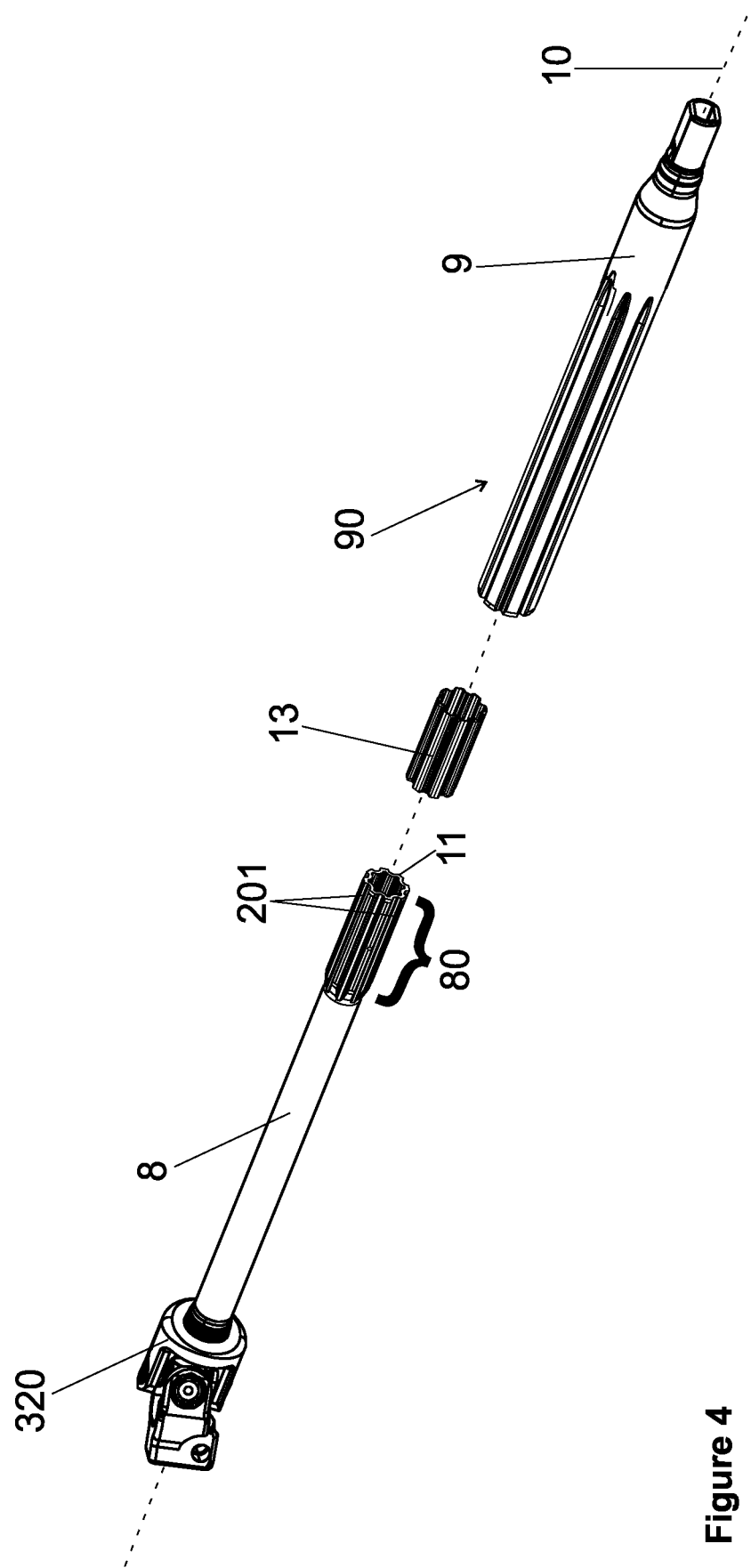
FIG. 4 is a perspective view of the steering shaft as per FIG. 3 before the mounting of the profiled sleeve.
Figure 5:
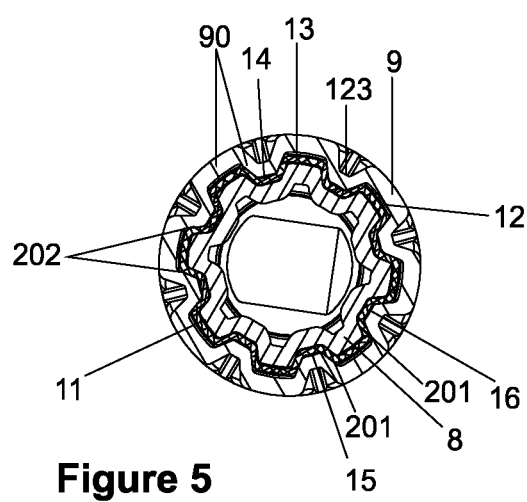
FIG. 5 is a cross-sectional view of a steering shaft.

As illustrated in FIGS. 3 to 5, the inner shaft 8 is, at its second end, in a defined region 80 on its outer circumferential surface, equipped with axially running radial projections 11 which are formed as an equidistant arcuate profile. The defined region 80 may be formed along the entire length of the inner shaft 8.

The outer shaft 9 is formed as a hollow shaft and is equipped, on its inner circumferential surface, with axially running grooves 12 into which the projections 11 of the inner shaft 8 engage, wherein the inner shaft 8 is connected in positively locking fashion in a rotational direction to the outer shaft 9 and can transmit the torques predefined by the driver using the steering wheel 2. In the example shown, the outer shaft also comprises, on its outer circumferential surface, axially running grooves 123 which are arranged at regular intervals as an equidistant arcuate profile 90. The arcuate profile 90 of the outer shaft 9 may be formed correspondingly to the arcuate profile of the inner shaft 8 along the entire length of the outer shaft 9, or only in a defined region 80.

A profiled sleeve 13 is fastened to the inner shaft 8 along the defined region 80. The profiled sleeve 13 may be designed to be shorter than or of equal length to the defined region 80. The profiled sleeve 13 comprises an undulating cross-sectional profile which lies closely against the radial projections 11, such that the inner circumferential surface of the profiled sleeve 13 is connected in positively locking fashion at least to the flanks 201 of the radial projections 11 or to the radial projections 11 of the inner shaft 8. After the connection to the inner shaft 8, the inner circumferential surface of the profiled sleeve 13 is connected fixedly to said inner shaft. The outer profile of the profiled sleeve 13 is designed correspondingly to the grooves 12 on the inner circumferential surface of the outer shaft 9.

In the assembled state of the steering shaft 3, the outer circumferential surface of the profiled sleeve 13 also lies against the grooves 12 and flanks 202 of the grooves 12 of the outer shaft 9, and thus forms a positively locking connection between inner shaft 11, profiled sleeve 13 and outer shaft 9, whereby a telescopic movement of the inner shaft 8 relative to the outer shaft 9 along an axis of rotation 10 is made possible. In this way, it is furthermore possible for torques to be transmitted between the inner shaft 8 and the outer shaft 9. The profiled sleeve 13, the inner shaft 8 and outer shaft 9 are, in the example, formed as an arcuate profile with an octagonal profile. This may furthermore be formed as a triangular or tetragonal or cloverleaf profile or hexagonal profile. The profiled sleeve 13 is firstly pushed onto the second end and positioned axially in the direction of the joint-side end along the defined region 80 on the walls 201 of the projections 11 or on the projections 11. Here, the sleeve 13 may be arranged centrally on the defined region 80 of the inner shaft 8, such that, on both sides, an equal spacing D1, D2 is provided to the end of the defined region 80. The spacing D1 may be shorter or longer than the spacing D2. Alternatively, the profiled sleeve 13 may comprise a spacing D1 in the direction of the joint-side end or a spacing D2 in the direction of the outer shaft 9. To permit an improved expansion or contraction of the profiled sleeve 13 in the presence of temperature fluctuations, the profiled sleeve 13 is connected to the inner shaft 8 only in punctiform fashion in the defined region 80. The connection may be realized by means of a single fastening point 14. It is however preferable for multiple fastening points 14, 15, 16 to be realized, which are arranged on a circle so as to be distributed over the circumference of the profiled sleeve 13 and of the inner shaft 8. In the specific exemplary embodiment in FIG. 5, three fastening points 14, 15, 16 are provided. By means of the arrangement of the fastening points 14, 15, 16 on a circle, it is ensured that all of the fastening points 14, 15, 16 are situated in the same axial portion of the profiled sleeve 13. It is hereby ensured that the occurrence of bulging or distortion of the profiled sleeve 13 when the latter expands or contracts owing to temperature fluctuations can be counteracted.

Figure 6:
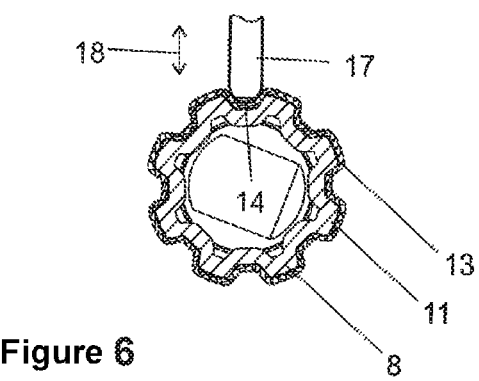
FIG. 6 is a cross-sectional view through an inner shaft during the fastening of the profiled sleeve.

As shown in FIG. 6, the fastening points 14, 15, 16 are produced by means of an ultrasonic sonotrode 17, by means of which the plastics material of the profiled sleeve 13 forms, by way of its inner circumferential surface, an intimate connection with the metallic surface of the inner shaft 8. For this purpose, the ultrasonic sonotrode 17 is applied from the outside inward in the radial direction 18, and is removed again after the production of the respective fastening point 14, 15, 16. As one having ordinary skill in the art would understand, producing an ultrasonic fastening point may involve local melting of the plastics material of the profiled sleeve 13 so that the profiled sleeve 13 at the fastening point conforms closely to the outer side of the inner shaft 11—at least more so than any other part of the profiled sleeve 13. In other words, the plastics material melts and flows into the microstructure of the outer side of the inner shaft 11 to create positive locking on a micro scale between the profiled sleeve 13 and the inner shaft 11.

It is alternatively possible for a punctiform connection to be provided between the outer circumferential surface of the profiled sleeve 13 and the walls 202 of the grooves 12 on the inner circumference of the outer shaft 9. The profiled sleeve 13 is firstly pushed fully into the outer shaft 9. When the profiled sleeve 13 no longer protrudes out of the outer shaft 9, the outer shaft 9 is connected to the profiled sleeve 13 at one or more fastening points 14, 15, 16.

Figure 7:
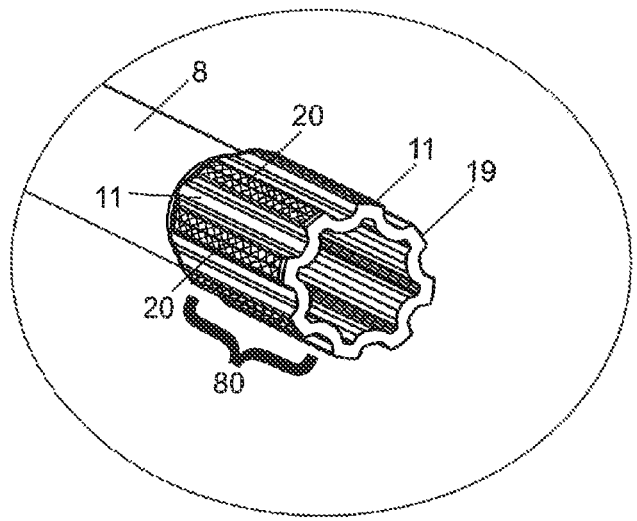
FIG. 7 is an enlarged detail view of an inner shaft with criss-crossed knurling.
Figure 8:
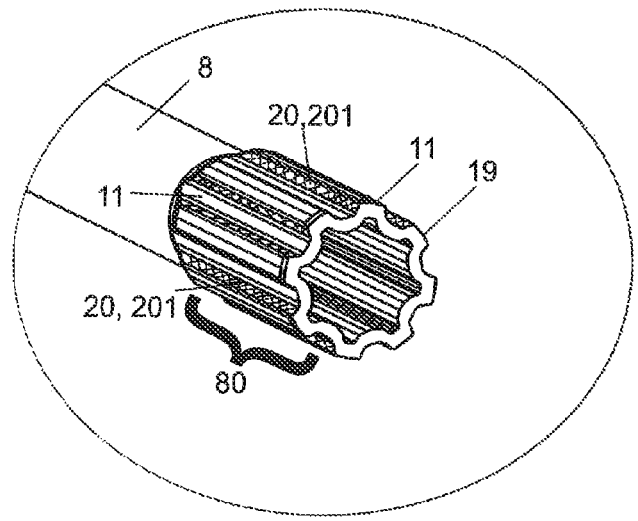
FIG. 8 is an enlarged detail view of an inner shaft with criss-crossed knurling as per FIG. 7.

In the enlarged illustration of FIG. 7 and FIG. 8, it is illustrated that the radial projections 11 of the inner shaft 8 are equipped with a criss-crossed knurling 20 on their radially outwardly pointing surface 19. As illustrated in FIG. 8, the knurling 20 is formed on the wall 201 of the inner shaft. By means of the criss-crossed knurling 20, the fastening of the profiled sleeve 13 to the inner shaft 8 is additionally improved, such that a reliable fastening remains ensured over the service life of the steering shaft 3.

Figure 9:
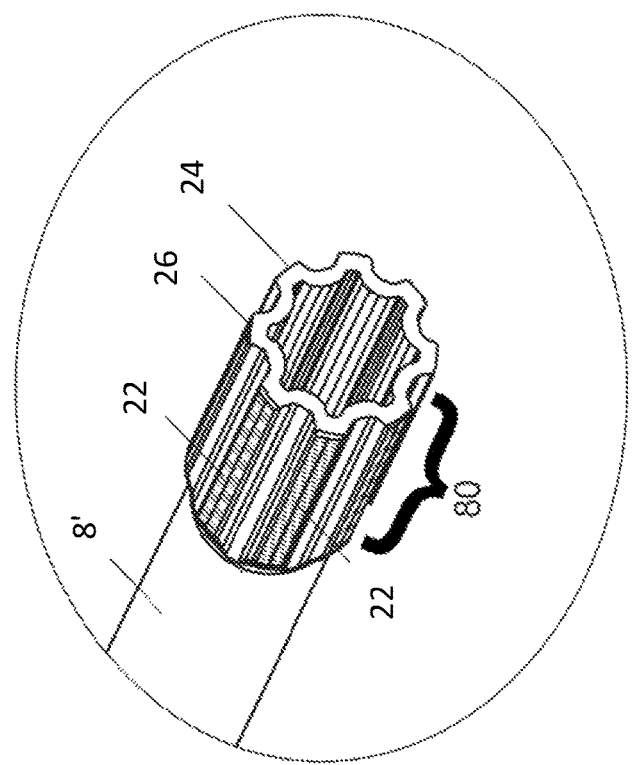
FIG. 9 is an enlarged detail view of an inner shaft with straight knurling on radial outer sides of axially running radial projections.

FIG. 9 shows an example inner shaft 8' that includes straight knurling 22 on radial outer sides 24 of axially running radial projections 26 of the inner shaft 8'.

Figure 10:
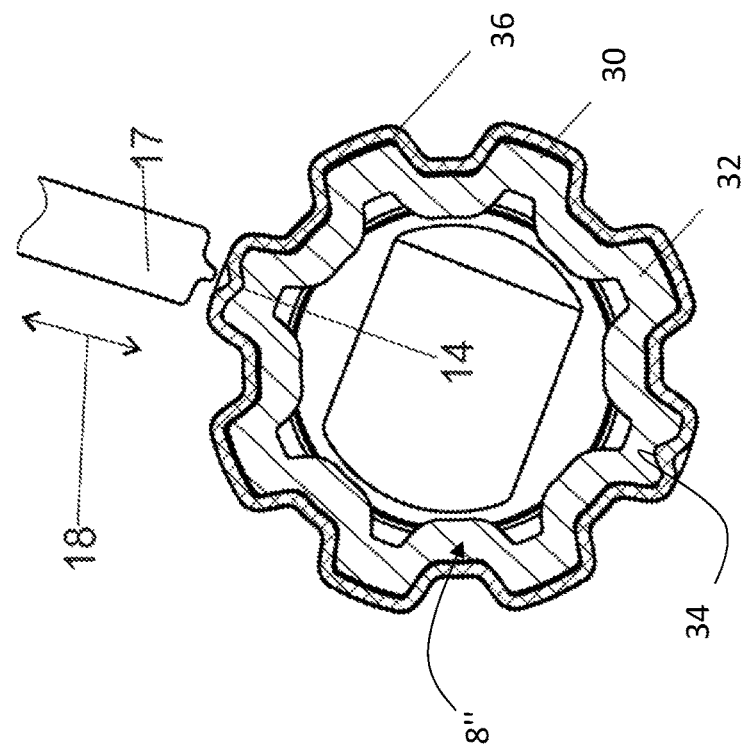
FIG. 10 is a cross-sectional view of an inner shaft where radial outer sides of axially running radial projections on the inner shaft include depressions into which a profiled sleeve is depressed.

FIG. 10 shows another example inner shaft 8" where radial outer sides 30 of axially running radial projections 32 of the inner shaft 8" include depressions 34 into which a profiled sleeve 36 is depressed.

FIG. 11 shows another example steering shaft 40 that includes an inner shaft 8''' with axially running radial projections 42 that extend along an entire length of the inner shaft 8'''.

FIG. 12 depicts a cross-sectional profile 50 of an example inner shaft that has axially running radial projections 52 that define a hexagonal shape.

FIG. 13 depicts a cross-sectional profile 60 of an example inner shaft that has axially running radial projections 62 that define a octagonal shape.

FIG. 14 depicts a sonotrode 70 that is about to impart ultrasonic vibrational energy to generate an ultrasonic fastening point 14 between a profiled sleeve 72 and an inner shaft 74. FIG. 15 shows the result, after the ultrasonic vibrational energy is provided by the sonotrode 70, where deformations 76 of the profiled sleeve 72 conform to a surface topography 78 of the inner shaft 74 to form the ultrasonic fastening point 14.

LIST OF REFERENCE DESIGNATIONS

1 Steering column
2 Steering wheel
3 Steering shaft
4 Steering gear
5 Toothed rack
6 Track rods
7 Vehicle wheel
8 Inner shaft
8' Inner shaft
8" Inner shaft
8''' Inner shaft
9 Outer shaft
10 Axis of rotation
11 Radial projections
12 Grooves
13 Profiled sleeve
14 Fastening point
15 Fastening point
16 Fastening point
17 Ultrasonic sonotrode
18 Radial direction
19 Radially outer surface
20 Criss-crossed knurling
22 straight knurling
24 radial outer sides
26 axially running radial projections
30 radial outer sides
32 axially running radial projections
34 depressions
36 profiled sleeve
40 steering shaft
42 axially running radial projections
50 cross-sectional profile
52 axially running radial projections
60 cross-sectional profile
62 axially running radial projections
70 sonotrode 72 profiled sleeve
74 inner shaft
76 deformations
78 surface topography

The invention claimed is:

1. A steering shaft for a motor vehicle, comprising:
an outer shaft;
an inner shaft arranged in the outer shaft and configured so as to be displaceable axially along the direction of an axis of rotation;
wherein the inner shaft includes axially running radial projections on an outer side thereof;
wherein the outer shaft includes axially running grooves on an inner side thereof, into which grooves the radial projections of the inner shaft engage in a positively locking manner in a direction of rotation and displaceably in an axial direction;
wherein the inner shaft includes a profiled sleeve having an inner circumferential surface that lays against flanks of the radial projections of the inner shaft and the outer circumferential surface of which lies against flanks of the grooves of the outer shaft; and
wherein the profiled sleeve is connected to the inner shaft by ultrasonic fastening points distributed over a circumference of the profiled sleeve, wherein deformations of the profiled sleeve at the ultrasonic fastening points conform more closely to the outer side of the inner shaft than any other part of the profiled sleeve.

2. The steering shaft of claim 1, wherein the projections of the inner shaft are equipped with a straight knurling on their radial outer side.

3. The steering shaft of claim 1 wherein each of the ultrasonic fastening points comprises a fixed connection between the profiled sleeve that is comprised of plastic and the inner shaft that is comprised of metal.

4. The steering shaft of claim 1 wherein radial outer sides of the axially running radial projections of the inner shaft include depressions into which the profiled sleeve is depressed.

5. The steering shaft of claim 1 wherein the axially running radial projections extend along an entire length of the inner shaft.

6. The steering shaft of claim 5 wherein the axially running radial projections of the inner shaft define an octagonal profile or a hexagonal profile.

7. The steering shaft of claim 1 wherein the deformations of the profiled sleeve at the ultrasonic fastening points conform to a microscopic surface structure of the outer side of the inner shaft.

8. A steering shaft for a motor vehicle, the steering shaft comprising:
an outer shaft;
an inner shaft arranged in the outer shaft and configured so as to be displaceable axially along the direction of an axis of rotation;
wherein the inner shaft includes axially running radial projections on an outer side thereof;
wherein the outer shaft includes axially running grooves on an inner side thereof, into which grooves the radial projections of the inner shaft engage in a positively locking manner in a direction of rotation and displaceably in an axial direction;
wherein the inner shaft includes a profiled sleeve having an inner circumferential surface that lays against flanks of the radial projections of the inner shaft and the outer circumferential surface of which lies against flanks of the grooves of the outer shaft; and
wherein the profiled sleeve is connected to the inner shaft by fastening points that are distributed over a circumference of the profiled sleeve and that prevent axial movement of the profiled sleeve relative to the inner shaft,
wherein radial outer sides of the axially running radial projections of the inner shaft include depressions into which the profiled sleeve is depressed.

9. The steering shaft of claim 8 wherein each of the fastening points comprises a fixed connection between the profiled sleeve that is comprised of plastic and the inner shaft that is comprised of metal.

10. The steering shaft of claim 8 wherein the axially running radial projections extend along an entire length of the inner shaft.

11. A steering shaft for a motor vehicle, the steering shaft comprising:
an outer shaft;
an inner shaft arranged in the outer shaft and configured so as to be displaceable axially along the direction of an axis of rotation;
wherein the inner shaft includes axially running radial projections on an outer side thereof;
wherein the outer shaft includes axially running grooves on an inner side thereof, into which grooves the radial projections of the inner shaft engage in a positively locking manner in a direction of rotation and displaceably in an axial direction;
wherein the inner shaft includes a profiled sleeve having an inner circumferential surface that lays against flanks of the radial projections of the inner shaft and the outer circumferential surface of which lies against flanks of the grooves of the outer shaft; and
wherein the profiled sleeve is connected to the inner shaft by fastening points that are distributed over a circumference of the profiled sleeve at only a single axial location along the profiled sleeve and that prevent axial movement of the profiled sleeve relative to the inner shaft.

12. The steering shaft of claim 11 wherein each of the fastening points comprises a fixed connection between the profiled sleeve that is comprised of plastic and the inner shaft that is comprised of metal.

13. The steering shaft of claim 11 wherein radial outer sides of the axially running radial projections of the inner shaft include depressions into which the profiled sleeve is depressed.

14. The steering shaft of claim 11 wherein the axially running radial projections extend along an entire length of the inner shaft.

15. The steering shaft of claim 14 wherein the axially running radial projections of the inner shaft define an octagonal profile or a hexagonal profile.

* * * * *